(12) United States Patent
Gallego Pleite et al.

(10) Patent No.: US 8,191,822 B2
(45) Date of Patent: Jun. 5, 2012

(54) DEVICE FOR AN AIRCRAFT POWER UNIT

(75) Inventors: Joaquín Gallego Pleite, Madrid (ES);
Alvaro Ortiz Del Cerro, Burgos (ES);
Francisco José Benitez Guerrero,
Madrid (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 850 days.

(21) Appl. No.: 12/206,832

(22) Filed: Sep. 9, 2008

(65) Prior Publication Data
US 2010/0006701 A1 Jan. 14, 2010

(30) Foreign Application Priority Data
Jul. 9, 2008 (ES) .................................. 200802041

(51) Int. Cl.
*B64D 29/08* (2006.01)
*B64D 45/00* (2006.01)
(52) U.S. Cl. ................... 244/53 R; 244/129.4; 116/28 R
(58) Field of Classification Search ................ 244/53 R, 244/129.4; 116/28 R
See application file for complete search history.

(56) References Cited

U.S. PATENT DOCUMENTS

| 4,365,775 | A | | 12/1982 | Glancy |
| 4,613,099 | A | * | 9/1986 | Smith et al. ................. 244/53 R |
| 5,518,206 | A | * | 5/1996 | Arnold et al. ............... 244/129.4 |
| 5,915,765 | A | * | 6/1999 | Sternberger ............. 292/256.69 |
| 6,148,607 | A | * | 11/2000 | Baudu et al. ................. 60/226.2 |
| 6,666,408 | B1 | | 12/2003 | De Carvalho et al. |
| 6,824,175 | B2 | * | 11/2004 | Porte ............................ 292/113 |

FOREIGN PATENT DOCUMENTS

EP 1 197 619 A1 4/2002

\* cited by examiner

*Primary Examiner* — Rob Swiatek
(74) *Attorney, Agent, or Firm* — Ladas & Parry LLP

(57) ABSTRACT

Device (3) for providing a warning signal when the fan cowl doors (8, 9) of an aircraft are not properly latched by primary locks (6), wherein the device comprises a panel (4) the panel (4) being rotatably mounted on one of the two fan cowl doors (8 or 9), the panel (4) being closed on that one fan cowl doors (8 or 9) by rotation thereby covering at least partially the primary locks (6), such that all the primary locks (6) have to be properly latched for the panel (4) to be closed, and at least one of the panel (4) primary locks (6) not being properly latched prevents proper closing of the panel (4).

7 Claims, 5 Drawing Sheets

DEVICE FOR AN AIRCRAFT POWER UNIT

FIELD OF THE INVENTION

The present invention relates to a device for indicating incorrect closure of the fan cowl doors of an aircraft power unit nacelle.

BACKGROUND OF THE INVENTION

An aircraft having a power unit supported in the airframe mounted configuration comprises an engine and a nacelle structure housing said engine. The nacelle structure comprises two displaceable parts called fan cowl doors or cowlings which can be opened on the ground during maintenance operations to access the various items of the power unit, the cowlings being closed and properly latched during operational conditions of the aircraft, therefore providing aerodynamic continuity for the power unit in flight.

The nacelle usually comprises at least one primary latch that fixes and latches the fan cowl doors during operation of the aircraft.

The indication of fan cowl doors not being properly latched is not a signal that is sent to the cockpit to avoid false open-door signals. For this reason, a visual inspection of the nacelle is necessary to detect if fan cowl doors are not properly latched.

The known procedures in the state of the art to detect if fan cowl doors are properly latched are based on the open primary latch visibility, as fan cowl doors in this position are flush with the other parts of the nacelle. When the primary latch is not closed, it must hang vertically. Moreover, and to improve latch visibility, the latch handle is painted with fluorescent colors.

The installation of the latches in the lower area of the fan cowls, their small size in comparison with the nacelle, and the location of the nacelle in some aircrafts, which is very close to the ground, make latch visual detectability very difficult.

Document U.S. Pat. No. 6,666,408 discloses a closure fault indicator for locking means interposed between two elements able to occupy with respect to one another an open position and a closed position, said indicator comprising retractable abutment means able to automatically maintain the two elements spaced from one another during the passage from the open position into the closed position. The indicator is arranged in such a way that the locking means can only be closed when the abutment means are retracted, preferably by a deliberate action on the part of an operator. The retractable abutment means maintaining the two elements open can be deactivated, so that the visual indication is lost, not being necessary for this deactivation to close the latches of the locking means, therefore being posed a problem of the aircraft being in a operating condition even though the locking means are not activated and the two elements are kept open.

Document U.S. Pat. No. 6,824,175 discloses a device for indicating incorrect closure of locking means consisting of a plurality of locking mechanisms located between two fan cowlings of an aircraft engine nacelle, this device including a body able to adopt, relative to the cowlings, a retracted position as well as a protruding position providing a warning of incorrect closure, this body in its retracted position being able to cover at least partially two of the locking mechanisms spaced along the longitudinal axis of the engine, said retracted position being exclusively authorized when each of the locking mechanisms that are able to be at least partially covered by the body is locked. The problem of such a device is that the design of the body of such a device has to be done taking into account both the tolerances of the fan cowlings and the aircraft engine, as well as the displacements and deformations of said fan cowlings, as said body adjusts on both cowlings. Moreover, as each type of aircraft engine needs a certain gap between the two fan cowlings when closed for providing an appropriate ventilation and drainage of the engine, the device of U.S. Pat. No. 6,824,175 has to be designed and adjusted so as to take this into account, therefore being its manufacture very complicated and leading to failures in the operating condition of the aircraft in which it is installed.

The present invention is oriented to the solution of the above-mentioned drawbacks.

SUMMARY OF THE INVENTION

The present invention relates to a device that provides a warning signal with high visibility when the fan cowl doors of an aircraft are not properly latched or locked.

The fan cowl doors of the nacelle structure of an aircraft housing the engine comprise several primary locking means that fix and latch said fan cowl doors. The device of the present invention indicates if these primary locking means are not properly latched. The device of the invention comprises a panel that is fixed by rotating means on one of the two fan cowlings, the panel being closed on that one fan cowling by means of several secondary locking means by rotating on said rotating means, therefore covering at least partially the primary locking means of the fan cowl doors, such that all the primary locking means have to be properly latched for the panel being closed. If the device is not closed, therefore being the primary locking means not properly latched, the panel of said device hangs vertically from the fan cowl door, therefore providing a high visibility warning signal of the aircraft fan cowl doors not being properly latched or locked.

Other features and advantages of the present invention will be disclosed in the following detailed description of an illustrative embodiment of its object in relation to the attached figures.

DETAILED DESCRIPTION OF THE INVENTION

Figure 1A:
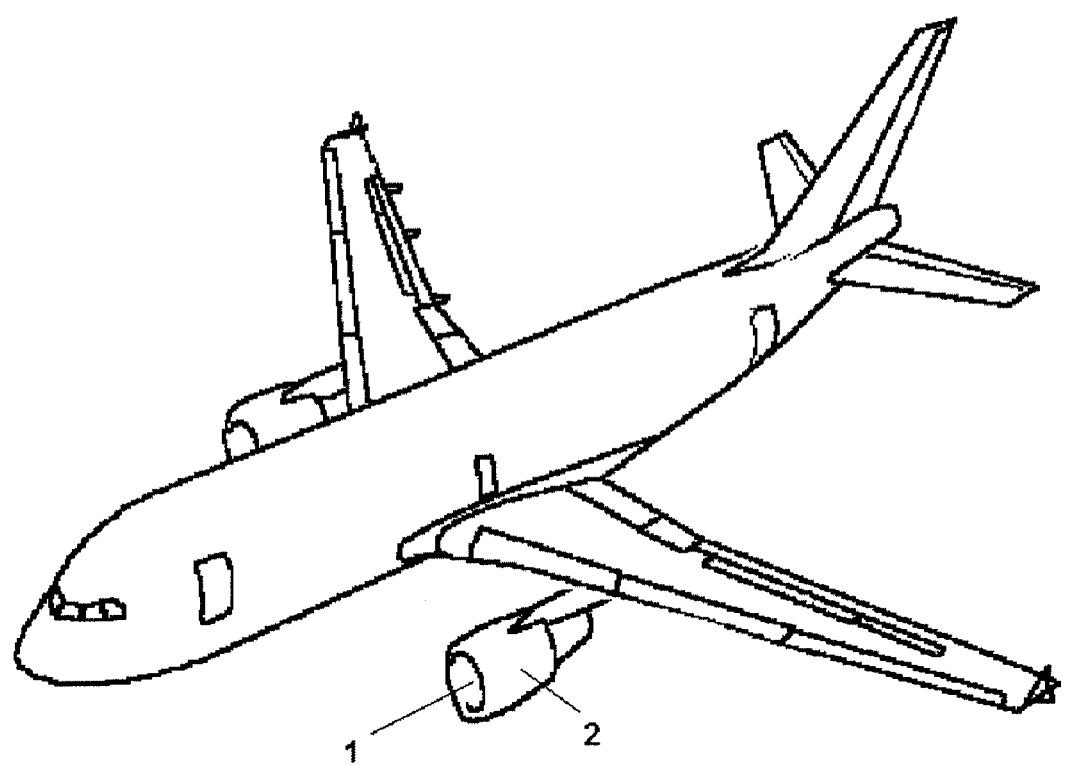
FIGS. 1a and 1b show the location of the fan cowl doors in an aircraft nacelle configuration.
Figure 1B:
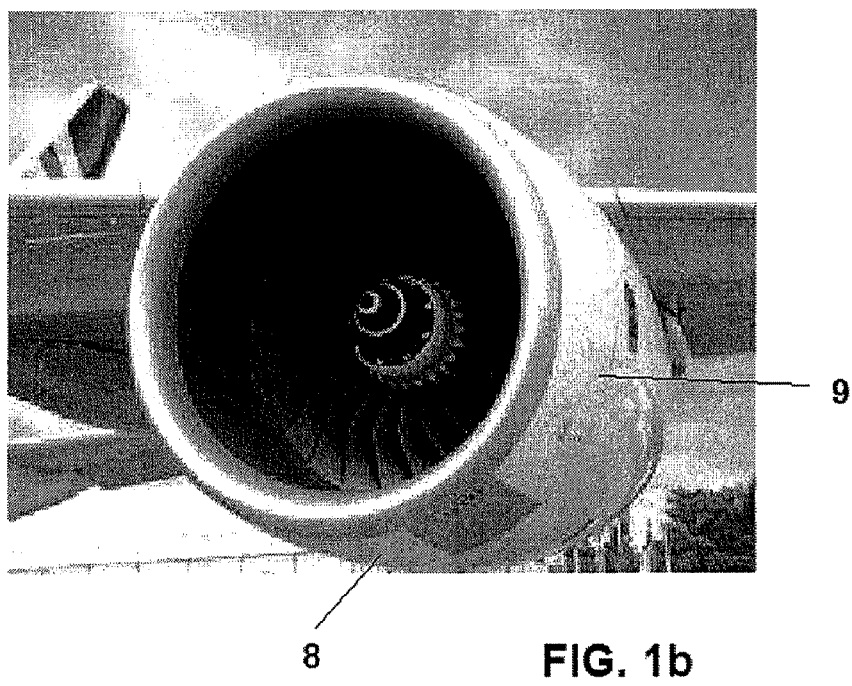
Figure 2:
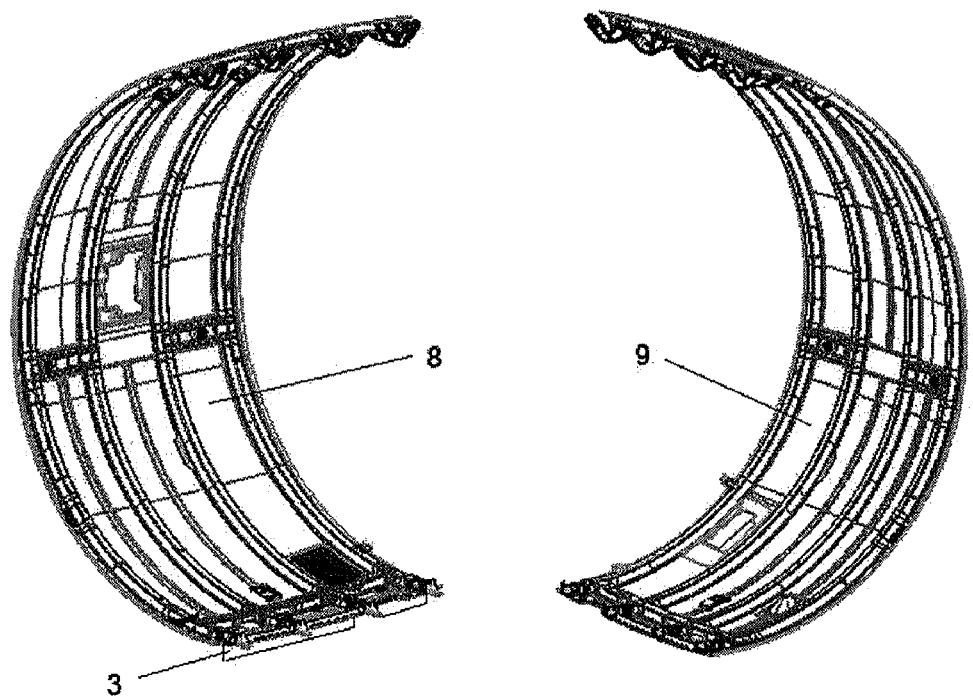
FIG. 2 shows schematically the location of the device according to the invention in the fan cowl configuration of an aircraft.
Figure 3A:
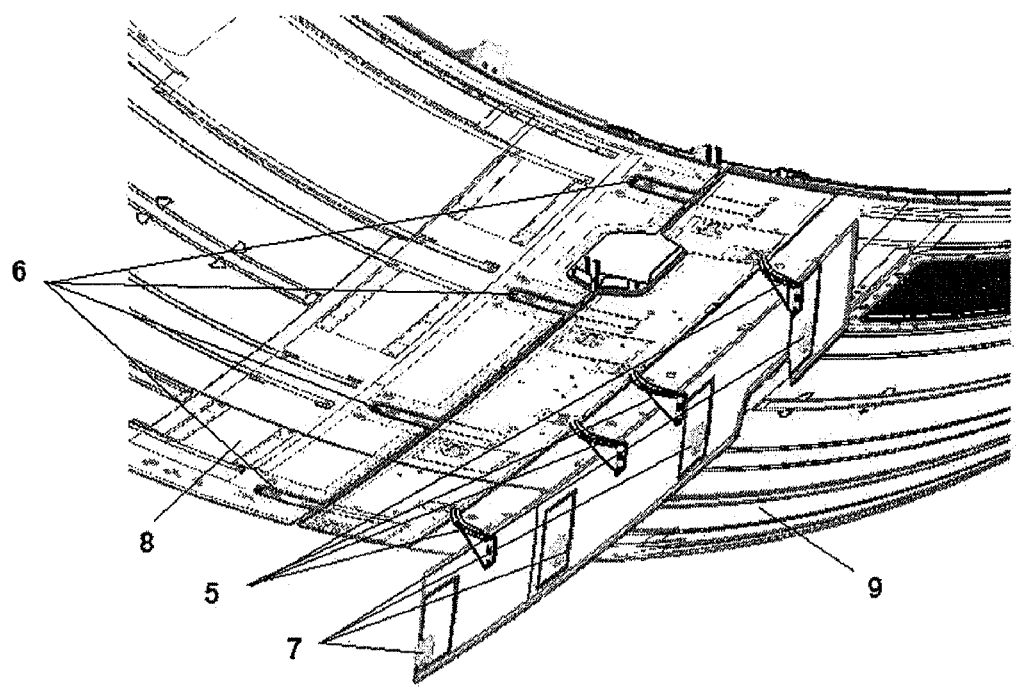
FIGS. 3a and 3b show the device according to the invention in an open position, so that the primary locking means are accessible in order to open the fan cowl doors.
Figure 3B:
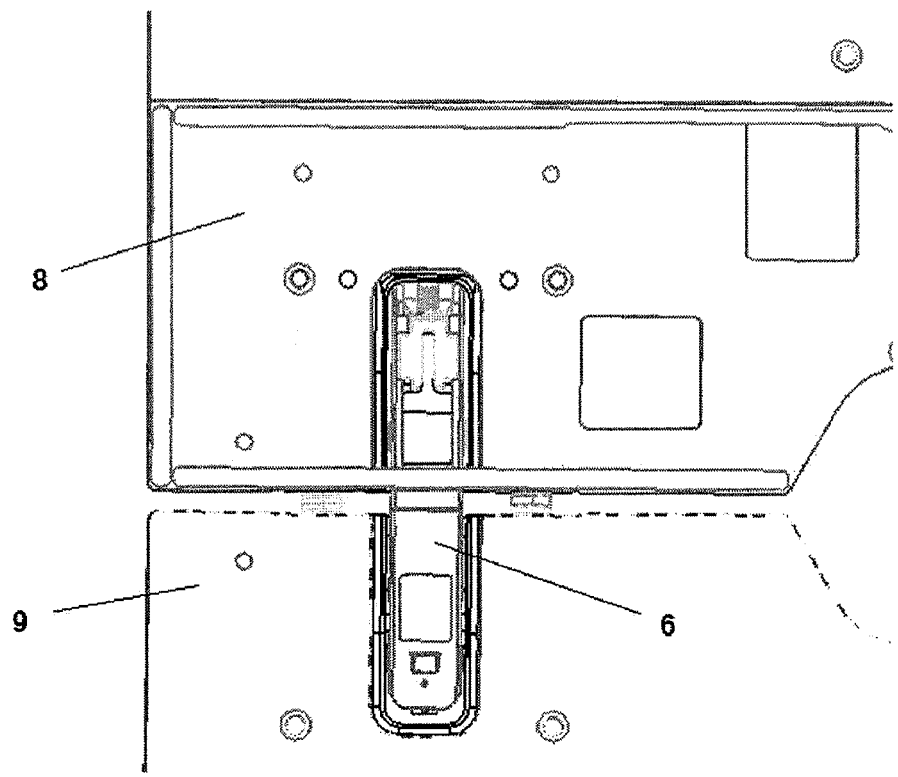

The present invention relates to a device 3 that provides a warning signal with high visibility when the fan cowl doors 8, 9 of an aircraft are not properly latched or locked. The fan cowl doors 8, 9 of the nacelle 2 structure of an aircraft housing the engine 1 comprise several primary locking means 6 that fix and latch said fan cowl doors 8, 9. The device 3 of the present invention indicates if these primary locking means 6 are not properly latched.

The device 3 of the invention comprises a panel 4 that is fixed by rotating means 5, preferably by several hinges 5, on one of the two fan cowl doors 8 or 9, the panel 4 being closed on that one fan cowling 8 or 9 by means of several secondary locking means 7 by rotating on said rotating means 5, therefore covering at least partially the primary locking means 6 of the fan cowl doors 8, 9, such that all the primary locking means 6 have to be properly latched or locked for the panel 4 to be closed. If the primary locking means 6 are not properly latched, the device 3 cannot therefore be closed, the panel 4 of said device 3 hanging vertically from the fan cowl door 8 or 9, therefore providing a high visibility warning signal of the aircraft fan cowl doors 8, 9 not being properly latched.

The primary locking means 6, preferably latches, are mounted on the fan cowl doors 8, 9 in such a way that, when at least one of them is not properly locked or latched, prevent proper closing of the panel 4. This can be achieved if a part of the primary locking means 6 protrudes or laps over the external surface of the closed fan cowl doors 8, 9 when primary locking means 6 are not locked. Only when all the primary locking means 6 are properly closed, is a proper closing of the panel 4 possible. This can be achieved if the primary locking means 6 are flush with or inside the external surface of the closed fan cowl doors 8, 9 when said primary locking means 6 are locked or latched.

The device 3 is therefore a hinged panel 4 that covers partially the primary locking means 6. If one primary locking means 6 is not properly closed, it will not be possible to close the panel 4 of the device 3 and it will then hang vertically from the fan cowl doors 8, 9. The panel 4 of the device 3 is painted in fluorescent colors and its size is such that it is made obvious by visual inspection that the primary locking means 6 are not latched.

Preferably, the number of hinges 5 will be four, and the number of secondary locking means 7 of the device 3 will also be four.

The device 3 of the invention is exposed to the airflow, but the aerodynamic step and gaps are optimized to reduce the parasitic drag.

Figure 5:
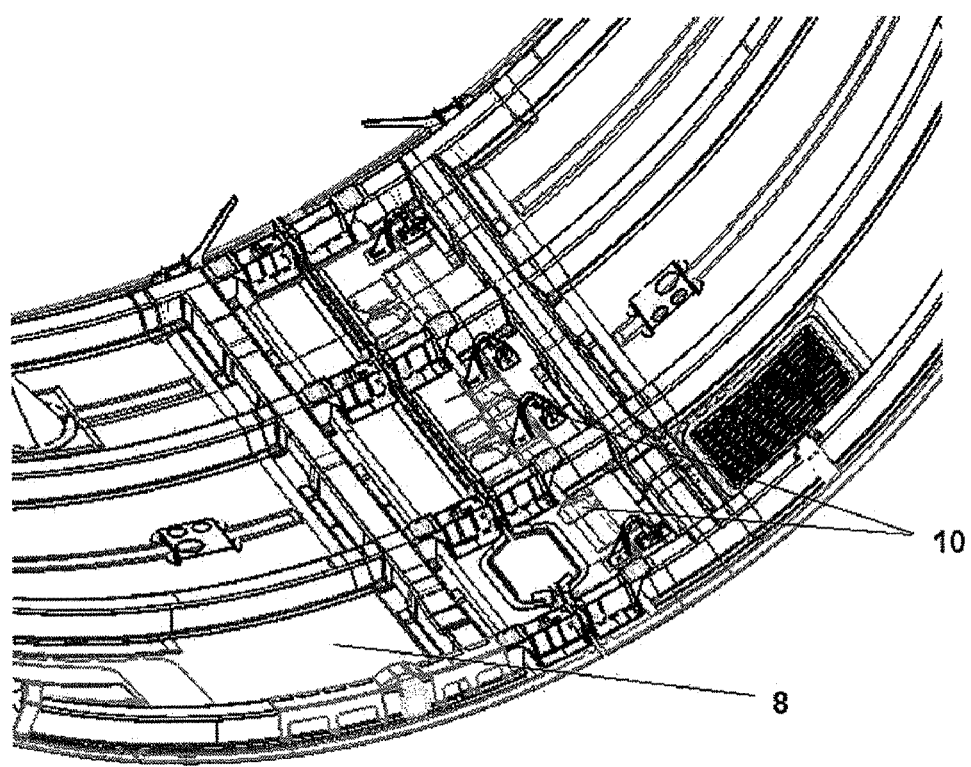
FIG. 5 shows the fixing means to be used in the case that the device according to the invention is not installed and the aircraft has to be dispatched.
Figure 6A:
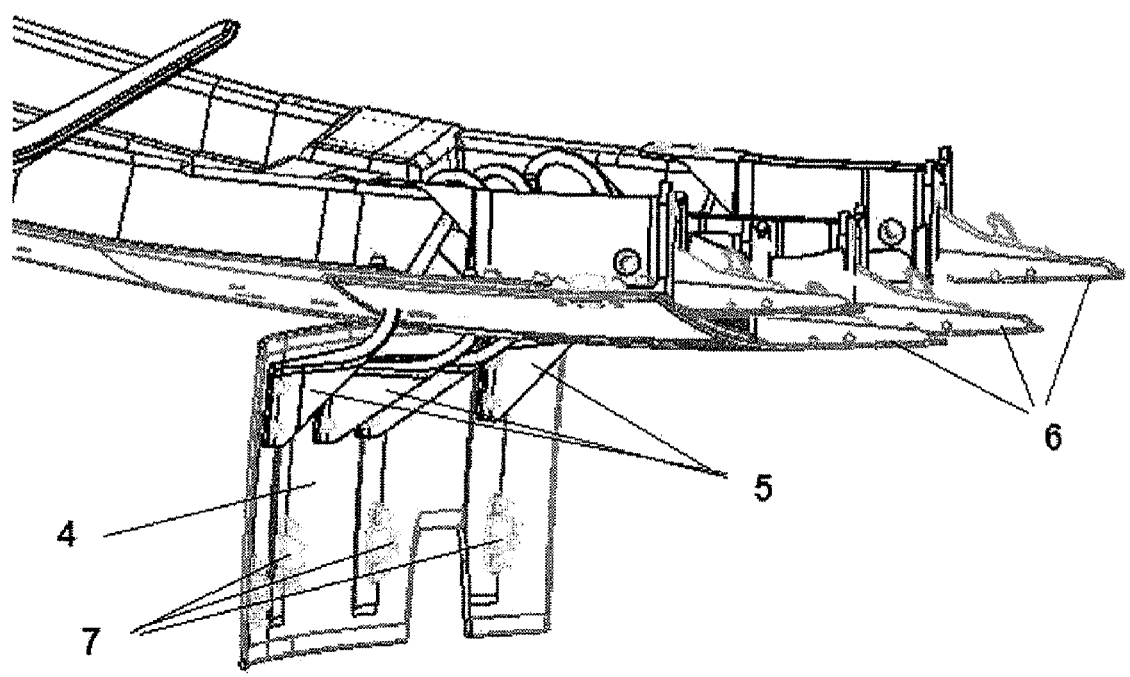
FIGS. 6a and 6b show the opening of the device according to the invention by accessing both the primary and secondary locking means.
Figure 6B:
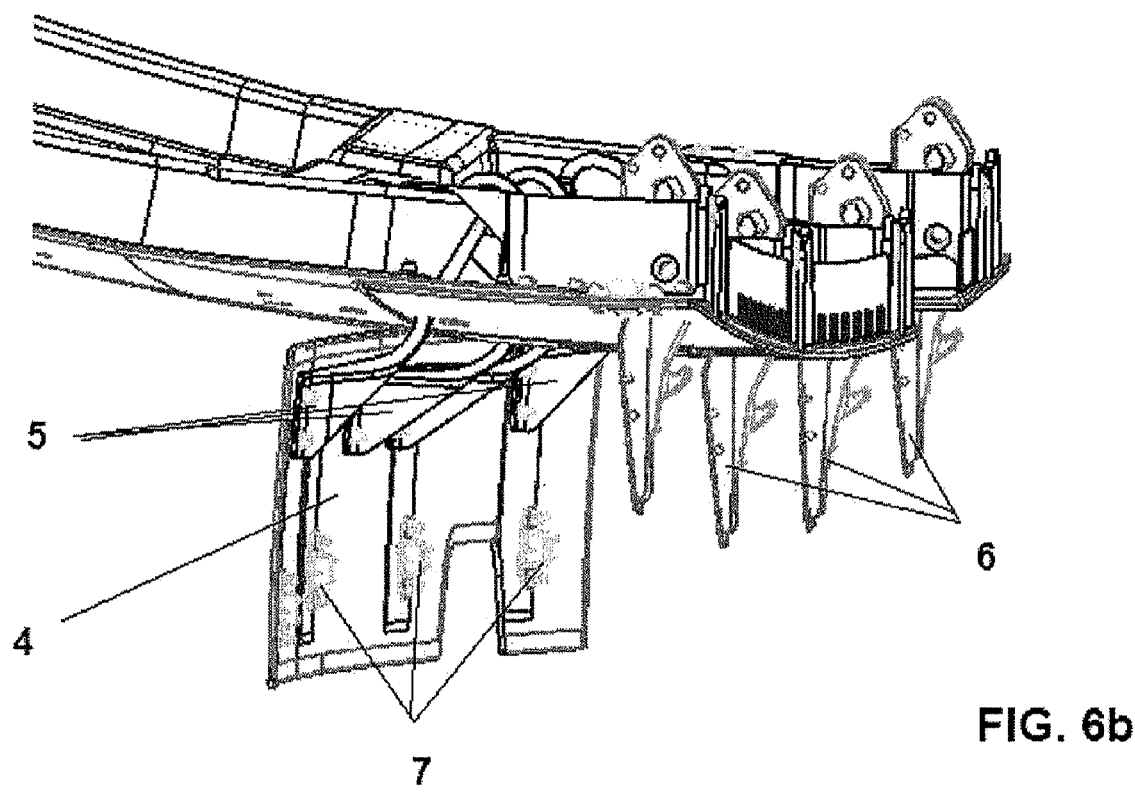

In case the device 3 is lost in flight or damaged, it is not mandatory to repair it or to install a new one. The aircraft can dispatch without the device 3 by installing the appropriate covering means 10 stored inside the fan cowl door 8 or 9 in which the device 3 is installed (see FIG. 5). If the device 3 is lost in flight or damaged, it is convenient to cover the holes of the rotating means 5 and of the secondary locking means 7 when the panel 4 of the device 3 is missing for lightning protection requirements, for ventilation adjustments at high flight speed and for aerodynamic improvements. Therefore, the covering means 10 stored inside the fan cowl door 8 or 9 are specifically designed to cover said holes when the device 3 is not installed.

The device 3 of the invention is interchangeable: the axis of the hinges 5 is removable and, in order to replace the device 3, it is not needed to remove the attachments between the hinges 5 and the panel 4 of the device 3, nor the base of the hinges 5 to the fan cowl door 8 or 9 in which the device 3 is installed.

Figure 4A:
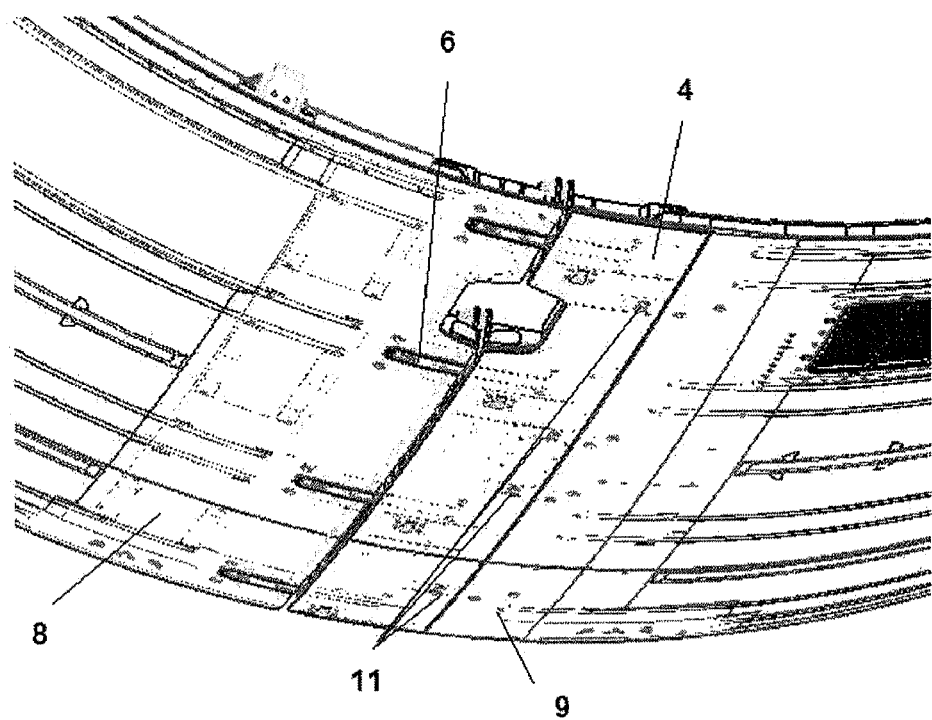
FIGS. 4a and 4b show the device according to the invention in a closed position, so that said device is partially over the primary locking means.
Figure 4B:
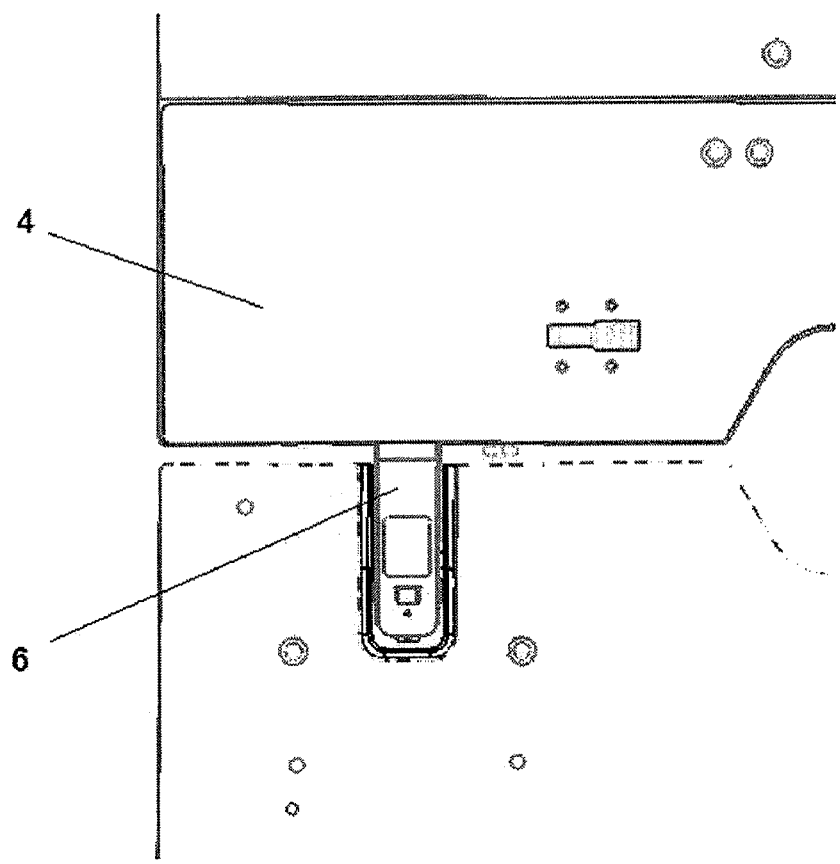

The device 3 is secured and closed by means of several flush latches 11, preferably four flush latches 11 (FIG. 4*a*).

In order to open the fan cowl doors 8, 9 the operator has to open the device 3 in order to operate the primary locking means 6. In order to close the device 3 the operator has to previously close all primary locking means 6 correctly.

Modifications comprised within the scope defined by the following claims can be introduced in the preferred embodiments which have just been described.

The invention claimed is:

1. Device for providing a warning signal when the fan cowl doors of an aircraft are not properly latched by primary locking means, said device comprising a panel wherein the panel is fixed by rotating means on one of the two fan cowl doors, the panel being closed only against that one fan cowl door by rotating on said rotating means therefore covering at least partially the primary locking means, such that all the primary locking means have to be properly latched for the panel to be closed, and at least one of the panel primary locking means not being properly latched prevents proper closing of the panel, said panel being of such a size that it does not prevent ventilation and drainage through a gap between said cowl doors.

2. Device for providing a warning signal when the fan cowl doors of an aircraft are not properly latched by primary locking means according to claim 1, wherein the panel hangs from the fan cowl door when such panel is not properly closed, providing a warning signal of the fan cowl doors not being properly latched.

3. Device for providing a warning signal when the fan cowl doors of an aircraft are not properly latched by primary locking means according to claim 1, wherein the panel of the device is painted in fluorescent colors, its size being such that it is made obvious by visual inspection that the panel hangs from the fan cowl door.

4. Device for providing a warning signal when the fan cowl doors of an aircraft are not properly latched by primary locking means according to claim 1, wherein the rotating means comprise hinges.

5. Device for providing a warning signal when the fan cowl doors of an aircraft are not properly latched by primary locking means according to claim 1, wherein the device is interchangeable by means of the axis of the rotating means being removable.

6. Device for providing a warning signal when the fan cowl doors of an aircraft are not properly latched by primary locking means according to claim 1, wherein the device comprises several flush latches that secure and close said device on the fan cowl door.

7. Device for providing a warning signal when the fan cowl doors of an aircraft are not properly latched by primary locking means, said device comprising a panel fixed by rotating means on one of the two fan cowl doors, the panel being closed on that one fan cowl door by rotating on said rotating means therefore covering at least partially the primary locking means, such that all the primary locking means have to be properly latched for the panel to be closed, and at least one of the panel primary locking means not being properly latched prevents proper closing of the panel wherein the fan cowl door in which the device is installed comprises covering means for covering the holes of the rotating means and of the secondary locking means when the device is not installed in the fan cowl door so that the aircraft is able to dispatch without said device being installed, while maintaining the aerodynamic requirements of the aircraft.

* * * * *